A. H. EMERY.
Peat Machine.
No. 58,190.
Patented Sept. 18, 1866.
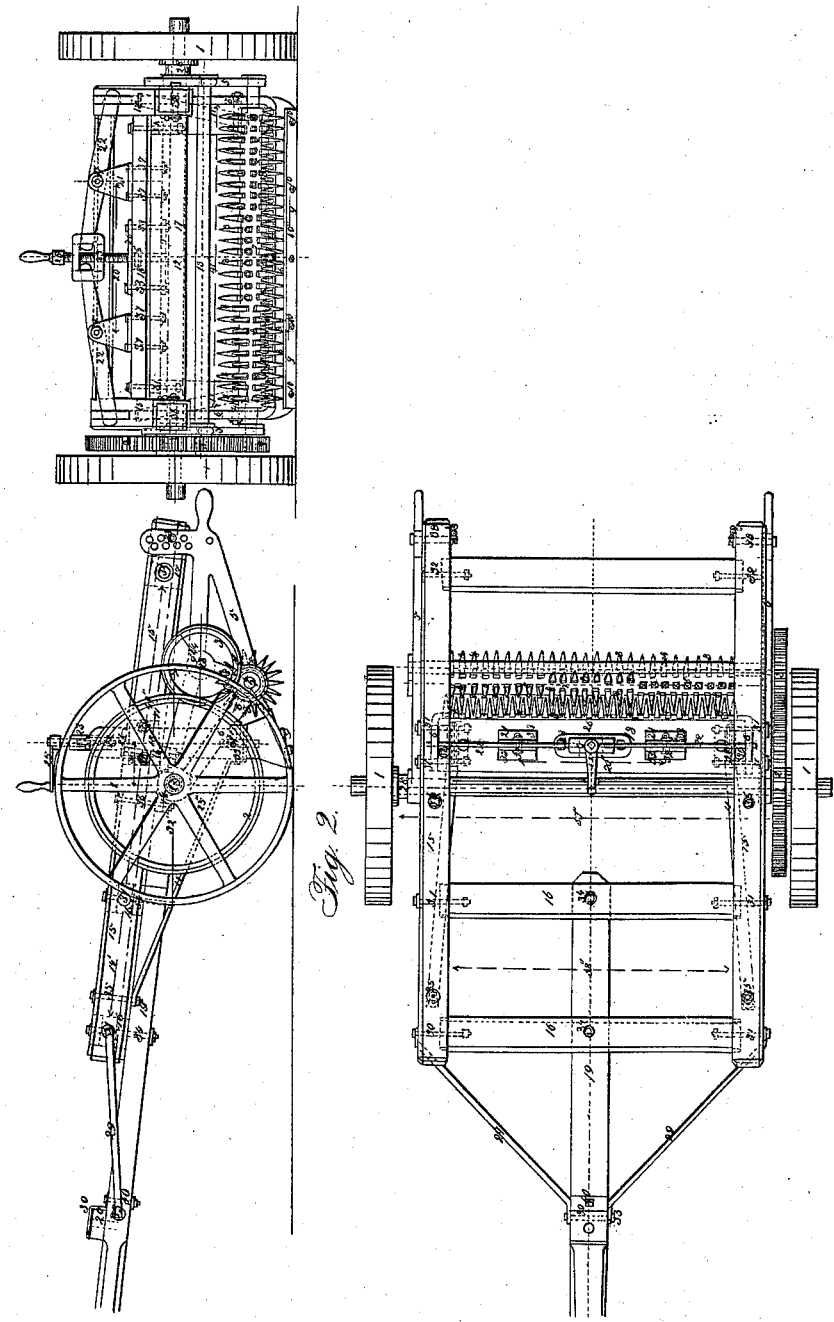
Witnesses:
Inventor:

UNITED STATES PATENT OFFICE.

A. H. EMERY, OF NEW YORK, N. Y.

IMPROVED MACHINE FOR SLICING AND DRYING PEAT.

Specification forming part of Letters Patent No. 58,190, dated September 18, 1866.

*To all whom it may concern:*

Be it known that I, ALBERT H. EMERY, of the city, county, and State of New York, have invented a new and useful machine, which I denominate a "peat-slicer," for cutting and dividing peat to facilitate its drying, of which the following is a full, clear, and exact description, reference being had to the accompanying drawings, forming part of this specification, and in which—

Figure 1 represents a plan of a machine constructed according to my invention; Fig. 2, a side elevation thereof, and Fig. 3 a rear elevation thereof.

Like numbers of reference indicate corresponding parts throughout the several figures.

The nature of my invention consists in an arrangement with or attachment to a suitable wheeled vehicle or frame of a transversely-arranged knife operating by the action of the draft to slice the peat, in combination with a breaker or divider in rear of the cutting-edge of the knife, and set in independent motion by the draft to divide or open the sliced peat for the purpose of facilitating the drying of the same; and said invention further consists, in combination with the knife or slicer, of a revolving toothed breaker acting in concert with a stationary toothed surface in rear of the knife; also, in a novel mode of connecting the knife-stock with the vehicle, and combination of means for raising or lowering the knife; likewise in a novel combination, with the revolving breaker, of certain devices for elevating or depressing the latter.

In the accompanying drawings, the parts numbered 15, 16, and 17 represent the frame of the machine; number 1 the running-wheels thereof, hung on a cross-axle, 12, preferably outside of the frame, and one of which may be loose, while the other, that forms a driver to certain working parts of the machine, is made fast to the axle, or so geared with it as to rotate the axle only during the forward travel of the machine after the manner of sundry mowing-machines. These wheels may either be plain, grooved, or studded on their peripheries.

Number 19 is the draft bar or pole to which the cattle are hitched to draw and work the machine.

Number 9 is a knife or slicer, arranged to extend crosswise of the frame at a suitable distance below it, and which may be set beveling upward backwardly. This knife serves, on being suitably depressed, to cut into and deliver the peat over it in form of a slice as the machine moves in a forward direction. It is shown as stationary—that is, irrespective of its general motion with the vehicle and adjustment relatively to the cut, as hereinafter described; but it may have a reciprocating or separate moving cutting action given it; also, if desired, be set to establish a shear-cut, and make either single or in section. As represented, however, said knife has its cutting-edge, which may be either plain or serrated, in a straight line transversely to the draft, and is bolted or otherwise secured to a stock or holder, 6, which, running across its top to within a moderate distance from its cutting-edge, extends backward, terminating in teeth or prongs 8, and which stock 6 is formed with vertically-slotted side uprights, that are guided below by bolts 41, projecting from pendent portions of the frame, and are directed and steadied above by the main frame 15 through slots in which said uprights pass. This forms a simple and steady mode of connecting the knife with the frame of the machine, while it permits of the knife being adjusted vertically either to clear the ground when not required to cut, or to enter and slice the peat at any required depth. This adjustment may be effected by any suitable means; but the following are preferred: On a cross-tree of the frame are erected standards 21, carrying a fulcrum-pin, 39, on which are hung levers 22. The one end of these levers gears with the uprights of the knife-stock 6, while their other and inner ends are connected with a screw nut or box, 23, which is raised or lowered by means of a vertical screw, having its bearings in the cross-sill of the frame, and operated by a hand-lever, 25, the turning of which to the right or left elevates or depresses the knife-stock equally at both sides by means of the levers 22 and sliding side uprights of the stock. Such means present a simple and effective arrangement for holding the knife and regulating its cut.

Secured to the axle of the running-wheels or driving-wheel of the axle is a spur-wheel, 2, that meshes into a wheel, 3, on a cross-shaft, 13, which wheel is in gear with a pinion, 4. These two last—namely, the wheel 3 and pinion 4—are hung on the ends of shafts, which, extending across the machine, are carried by hangers 5 on either side of the machine. These hangers have their bearings on the main axle 12, and are adjustable at their outer ends by passing locking-pins 38 through any one of a series of holes made in an arm of either hanger, so as to raise or lower the axle of the pinion 4, without, however, throwing the wheels and pinion out of gear, thereby obviating breakage. Any other mode of adjustment, however, if preferred, may be adopted.

The axle of the pinion is made to form or carry for the width of the frame, or thereabout, a drum or breaker made up of radial prongs or teeth 8, preferably arranged in sets of six in a row, at a suitable distance apart, and operating to play between the prongs 8 of the knife-stock 6 as and when the pinion 4 is set in motion by the forward travel of the vehicle, which gives a revolving movement to the breaker on the pinion-shaft in a direction that causes its prongs to work downwardly through the spaces which separate the prongs of the knife-stock, for the purpose, as if it were a revolving harrow, of breaking up or dividing and opening the peat as it is delivered in a slice by the action of the knife, and so depositing it on the ground in rear of the vehicle in a state which facilitates the drying of it by exposure to the sun and atmosphere.

By raising or lowering the hangers 5 said revolving breaker is adjusted to suit the thickness of peat cut, or may be so raised as to clear the ground surface and stones, or other obstacles, in moving the machine to and from its place of work. Said breaker, as also the pronged knife-stock, may be constructed otherwise than described, to act with like effect in breaking up or opening the peat sliced by the knife.

What I claim as my invention, and desire to secure by Letters Patent, is—

1. The combination, for cutting peat to facilitate its drying, of a knife or slicer attached to or carried by a wheeled vehicle and breaker set in motion by the draft, for operation together, substantially as specified.

2. The combination, with the knife or slicer 9 and its pronged stock or cover, of a revolving toothed breaker arranged and operating together, essentially as and for the purpose or purposes herein set forth.

3. Connecting the knife-stock with the frame of the vehicle by means of slotted side uprights made capable of vertical adjustment through the frame, as specified.

4. The combination, with the sliding uprights of the knife-stock, of the levers 22, screw nut or box 23, and its adjusting-screw, for action together, as shown and described.

5. In combination with a revolving toothed breaker, the hangers 5, supported by or on the axle of the running-wheels, also carrying the revolving shaft of the breaker, with its gear, and made adjustable relative to the frame of the machine, substantially as specified.

A. H. EMERY.

Witnesses:
JOHN T. BURR,
E. BORN.